Sept. 8, 1953

E. M. BUYER 2,651,753

PULSE KEYING SYSTEM

Filed Oct. 2, 1952

INVENTOR
EDWARD M. BUYER
BY Percy P. Lantzy
ATTORNEY

Patented Sept. 8, 1953 2,651,753

UNITED STATES PATENT OFFICE 2,651,753

PULSE KEYING SYSTEM

Edward M. Buyer, Ramsey, N. J., assignor to Federal Telecommunication Laboratories, Inc., Nutley, N. J., a corporation of Delaware Application October 2, 1952, Serial No. 312,696

8 Claims. (Cl. 324—57)

This invention relates to pulse keying systems and particularly to a pulse keying system which can be used for testing of multihop radio link equipment.

The main purpose of the invention is to provide a novel system for distortionless interuption of a closed loop transmission circuit, such as a television or multichannel telephone transmission system at an arbitrary instant of time.

Since keying usually causes the pulses sent out on the transmission system by the keyed stages to change abruptly, said abrupt changes may produce transients and thus disturb the shape and character of the transmitted pulses, particularly if the keying speed is high.

Prior art pulse keying circuits attempt to balance out said transient but cannot achieve its perfect cancellation.

Therefore, an object of this invention is a circuit for keying a system without introducing an initial switching transient.

A further object of the invention is to provide a system which may be used for testing of multihop radio link equipment.

A feature of the system is that it permits simulation of a "long" transmission circuit involving many repeaters by using only a single or two hops of such circuits. This is accomplished by recirculating a signal through one or two hops in conjunction with the keying circuit of this invention.

The above-mentioned and other features and objects of this invention will become more apparent by reference to the following description taken in conjunction with the accompanying drawings, in which.

Figure 1:
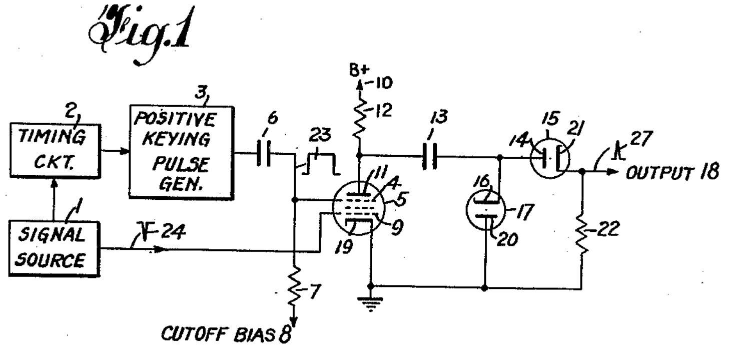
Fig. 1 is a schematic circuit diagram of a keying system according to the invention.

Referring to Fig. 1, a signal source 1 has coupled thereto a timing circuit 2, providing appropriate pulse delays, and a synchronized positive keying pulse generator circuit 3, all such circuits being suitable conventional type. The synchronized positive keying pulses produced by generator 3 are impressed on suppressor grid 4 of a multi-electrode tube 5, through capacitor 6. A source of the cut-off bias voltage 8 is connected across a resistor 7 to the suppressor grid 4.

The signal source 1 is also connected to the control grid 9 of the tube 5. The voltage source 10 is applied at the anode 11 of the keying tube 5 across a resistor 12. A diode vacuum tube 17 or other directional element is connected in shunt and another diode or directional element 15 is connected in series with the output 18 of tube 5 as follows: The anode 11 of tube 5 is coupled to the anode 14 of the diode 15 and to the cathode 16 of the diode 17 by a capacitor 13. The cathode 19 of the tube 5 and the anode 20 of shunt diode 17 are connected to ground. The cathode 21 of diode 15 is connected to the output terminal 18 and also to ground through a resistor 22.

The keying circuit operates as follows: First, for proper signal transmission through the keyer, the positive keying input voltage from generator 3 must have a flat maximum or minimum, as for example, a rectangular pulse 23. The keyer is triggered by a negative input signal pulse 24 from source 1 during this period when the positive input keying voltage 23 is not changing. Tube 5 is normally cut-off by the suppressor grid bias, and the keying pulse 23 causes conduction in the tube 5. When the plate voltage applied at 10 drops due to conduction of tube 5, the capacitor 13 discharges through the shunt diode 17 until the voltage across capacitor 13 equals the plate voltage of the tube 5. This produces negative pulse 25, curve C, Fig. 2, at the cathode 16. The negative pulse 25 at the cathode 16 of the diode 17, however, is not transmitted through the diode 15 since the plate 14 of the latter is negative with respect to its cathode 21. Hence the leading edge of the keying pulse 23 does not appear at the output 18.

Figure 2:
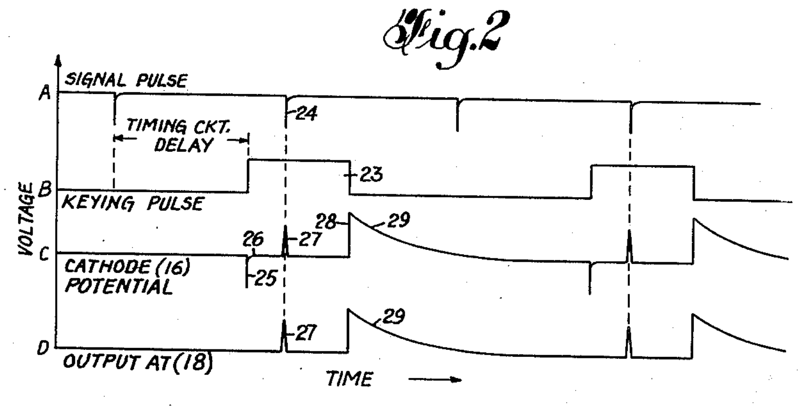
Fig. 2 shows waveforms useful in explaining the operation of the circuit shown in Fig. 1.

The shunt diode 17 is used to bring the charge on the capacitor 13 to equilibrium very quickly after the leading edge of the keying pulse 23 appears without affecting the low-frequency response of the circuit during the signal period. This is shown by the portion 26 of curve C, Fig. 2. As shown by the waveforms of Fig. 2, the circuit is keyed to pass alternate pulses from source 1, the curve A being a waveform of the signal pulses of pulse source 1. Curve B is a waveform of keying pulse from generator 3 showing the timing delay produced by the timing circuit 2. Curve C is a waveform in the cathode 16 of diode 17, and curve D is a waveform of the output at 18. The negative test pulse 24 is applied at the control grid of tube 5 while plate current is flowing due to pulse 23. The test pulse hence appears as a positive signal at anode 11. Diode 17 does not conduct at this time since its cathode 16 is positive, and the test pulse passes through diode 15 to the output 18.

At the termination of pulse 23, the anode 11 voltage rises and a positive output pulse is passed through diode 15 to the output 18. This output pulse 28 decays along curve 29 as capacitor 13 becomes charged through the path consisting of resistor 12, capacitor 13, diode 15 and resistor 22. It can be seen that no leading edge keying transient appears in the wave D. This method is particularly useful where the trailing edge transient is not important, as is often the case.

Figure 3:
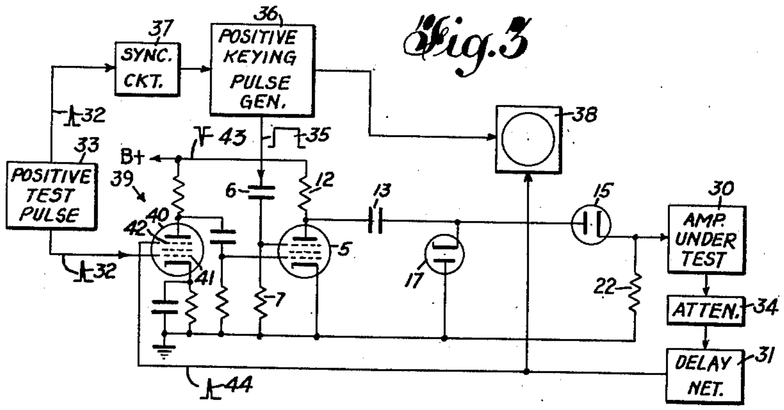
Fig. 3 is a circuit diagram of the circulating pulse arrangement according to the invention.

An important application of this invention is in a video circulating pulse system, where pulses are allowed to recirculate through an amplifier in order to predict the performance of any of such amplifiers cascaded in a relay system. A brief description of its principles, with reference to the circuit diagram of the circulating pulse arrangement shown in Fig. 3 wherein an amplifier 30 is under test, will make clear this application of the invention. The main elements of this application circuit are easily recognized as parts of the original circuit, shown in Fig. 1, the corresponding elements of the two figures being given like reference characters. The delay network 31 introduces a delay greater than the width of the test pulse 32 of source 33 to prevent the leading portion of a pulse from overlapping the trailing portion of the preceding pulse. The attenuator 34 reduces the loop gain to unity so that each pulse will be of equal amplitude. The positive keying pulse 35 of generator 36 is synchronized to the test pulse 32 through delay circuit 37 similarly as hereinbefore described. When the test pulse has circulated the desired number of times, the system is cut off. In order to view the pulse shapes resulting from the test pulse circulated, an oscilloscope 38 is synchronized with the keying pulse 35, thereby providing a stationary picture of a train of pulses circulating through the system. Recirculation of the test pulses 32 as output pulses 44 is obtained by providing an input coupling stage 39 having a vacuum tube 40 similar to tube 5. The tube 40 is provided with a control grid 41 to which the test pulse 32 is applied, while the output pulse 44 of the loop 30, 34, 31 is applied to the suppressor grid 42 thereof. The output pulses 43 of tube 40 are negative and are applied as the input pulse to tube 5 together with the keyer pulse 35 the same as described in connection with the circuit of Fig. 1.

Figure 4:
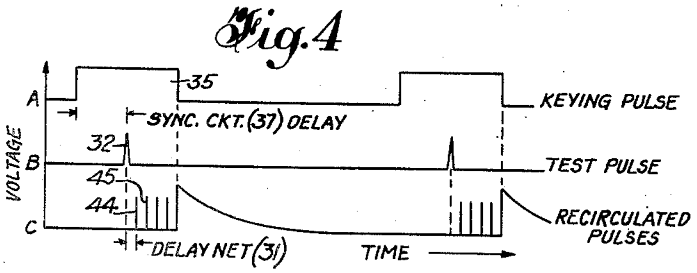
Fig. 4 shows the waveform sequences useful in explaining the circulating pulse arrangement shown in Fig. 3.

Fig. 4 shows the waveform sequences in the above-described circulating pulse system. The leading edge of the keying pulse is eliminated as in Figs. 1 and 2 thus avoiding circulation of a corresponding transient. The series diode 15 accomplishes this. The pulse 32 which first triggers the circuit in coincidence with keying pulse 35 will first appear on the oscilloscope 38 as pulse 44 as shown in curve C, Fig. 4. Since the pulse 44 is also recirculated, it will produce a second pulse 45 on the oscilloscope delayed an amount corresponding to the delay characteristics of the network 31 plus the time consumption of the remaining circuit elements of the loop. The retention characteristics of the oscilloscope is such that a series of recirculating pulse indications will be shown simultaneously on the screen substantially as indicated in curve C, the number of such pulse indications 44, 45, etc., depending upon the recirculation cycles of an input test pulse, or until termination of keyer pulse 35. If the amplifier or other circuit under test is functioning satisfactory, the pulse series 44, 45, etc., of curve C will show uniformity, and if it is not functioning properly, the pulse series will show distortion, the degree of distortion increasing for each successive pulse circuluated.

While I have described above the principles of my invention in connection with specific apparatus, it is to be clearly understood that this description is made by way of example only and not as a limitation to the scope of my invention as set forth in the objects thereof and in the accompanying claims.

I claim:

1. In a pulse keying system, an electron discharge device, means to normally bias said device to cut off, a capacitor coupled to the output of said device, a pair of unidirectional elements, one coupled in series with said output and the other connected in shunt with said output, means to apply a keying voltage having a substantially flat voltage portion to the input of said device to overcome said cut off bias, and means to apply a test pulse of short duration to the input of said device in coincidence with the flat voltage portion of said keying voltage, the shunt coupled element serving to stabilize the charged condition of said capacitor following application of the leading edge of said keying voltage and said series coupled element serving to pass only those variations of a given polarity relative to said stable charged condition.

2. In a pulse keying system according to claim 1, wherein the means for applying a keying voltage includes a pulse generator and means for synchronizing the output of said pulse generator with the occurrence of said test pulses.

3. In a pulse keying system according to claim 2, wherein said device includes two grid electrodes and the means for applying said keying voltage is coupled to one of said grid electrodes and the means for applying the test pulse is coupled to the other of said grid electrodes.

4. In a pulse keying system according to claim 1, wherein said capacitor is coupled between the anode of said electron discharge device and said unidirectional elements, said elements each having an anode and a cathode, one side of said capacitor being coupled to the cathode of said shunt coupled element and to the anode of said series coupled element.

5. In a pulse keying system according to claim 1, further including means for recirculating the output of said series coupled element through said keying system, including means for applying the output of said series coupled element to said electron discharge device.

6. In a pulse keying system according to claim 5, wherein said means for recirculating the output of said series coupled element includes means for imposing a delay of a given time interval to such output.

7. In a pulse keying system according to claim 5, wherein said means for recirculating the output of said series coupled element includes a circuit, the operating characteristics of which are to be tested, and means for displaying the pulses circulated to indicate the operating characteristics of the circuit under test.

8. In a pulse keying system according to claim 5, wherein the means for recirculating the output of said series coupled element includes a circuit the operation of which is to be tested and an attenuator for evening up the pulses recirculated, and means for delaying the pulses circulated by a given time interval, an oscilloscope, means to synchronize said oscilloscope with said keying voltage and means for applying the recirculating pulses to said oscilloscope after passing through the circuit under test.

EDWARD M. BUYER.

References Cited in the file of this patent

Beck, Proceedings of the Institute of Radio Engineers, vol. 35, No. 11, November 1947, pages 1226–1230.